US008762232B2

(12) United States Patent
Ahmed (10) Patent No.: US 8,762,232 B2
(45) Date of Patent: *Jun. 24, 2014

(54) METHOD FOR ACCOUNTING INFORMATION HANDLING IN AN INTERWORKING

(75) Inventor: Hanan Ahmed, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 185 days.

This patent is subject to a terminal disclaimer.

(21) Appl. No.: 12/690,734

(22) Filed: Jan. 20, 2010

(65) Prior Publication Data

US 2011/0178904 A1    Jul. 21, 2011

(51) Int. Cl.
*G07B 17/00*  (2006.01)
*H04L 12/28*  (2006.01)
*H04M 11/00*  (2006.01)
*G06F 15/173* (2006.01)

(52) U.S. Cl.
USPC .............. 705/30; 370/351; 455/406; 709/229

(58) Field of Classification Search
None
See application file for complete search history.

(56) References Cited

U.S. PATENT DOCUMENTS

| | | | |
|---|---|---|---|
| 6,760,417 B1 | 7/2004 | Wallenius | |
| 6,999,449 B2 | 2/2006 | Barna et al. | |
| 8,078,171 B2 * | 12/2011 | Taaghol et al. | 455/436 |
| 2002/0046277 A1 * | 4/2002 | Barna et al. | 709/224 |
| 2006/0026019 A1 | 2/2006 | Sethi et al. | |
| 2007/0115898 A1 * | 5/2007 | Stein | 370/338 |
| 2008/0089272 A1 * | 4/2008 | Ahokangas | 370/328 |
| 2008/0101291 A1 | 5/2008 | Jiang et al. | |
| 2008/0123605 A1 * | 5/2008 | Cho et al. | 370/338 |
| 2008/0183604 A1 * | 7/2008 | Chou | 705/30 |
| 2008/0192770 A1 | 8/2008 | Burrows et al. | |
| 2008/0219218 A1 * | 9/2008 | Rydnell et al. | 370/331 |
| 2008/0305772 A1 * | 12/2008 | Balasubramanian et al. | 455/411 |
| 2009/0005006 A1 * | 1/2009 | Zhang | 455/411 |
| 2009/0070272 A1 * | 3/2009 | Jain | 705/75 |
| 2009/0083060 A1 * | 3/2009 | Sherman et al. | 705/1 |
| 2009/0225705 A1 * | 9/2009 | Kwon et al. | 370/329 |
| 2009/0303966 A1 | 12/2009 | Cherian et al. | |
| 2010/0027448 A1 * | 2/2010 | Puthiyandyil et al. | 370/310 |
| 2010/0070617 A1 * | 3/2010 | Chakri et al. | 709/220 |
| 2010/0085978 A1 * | 4/2010 | Ramankutty et al. | 370/401 |
| 2010/0136972 A1 * | 6/2010 | Hsieh et al. | 455/436 |
| 2010/0285797 A1 * | 11/2010 | Ghai et al. | 455/426.1 |

(Continued)

OTHER PUBLICATIONS

WIMAX, "3GPP EPS Interworking," WiMAXX Forum Proprietary, Sections 18 and 19, 2008, 3 pages.
3GPP TS 23.402 V8.4.1, "3rd Generation Partnership Project, Technical Specification Group Services and System Aspects; Architecture Enhancements for Non-3GPP Accesses (Release 8)," Jan. 2009, pp. 1-191.

(Continued)

*Primary Examiner* — Mussa A Shaawat
(74) *Attorney, Agent, or Firm* — Slater & Matsil, L.L.P.

(57) ABSTRACT

A method for accounting information handling in an interworking is provided. A method for processing accounting information by a gateway device includes sending an accounting request message to a first electronic device, and receiving a response message from a first electronic device, the response message responsive to the accounting request message. The accounting request message is related to a communications device attached to the first network. The method also includes processing accounting information. The processing is based on the response message, the gateway device and the first electronic device are part of the first network, the communications device is accessing a second network through the first network, and the communications device has a subscription only with the second network.

19 Claims, 4 Drawing Sheets

(56) References Cited

U.S. PATENT DOCUMENTS

| | | | |
|---|---|---|---|
| 2010/0304737 A1* | 12/2010 | Jain et al. | 455/426.1 |
| 2011/0013597 A1* | 1/2011 | Hwang et al. | 370/331 |
| 2011/0164596 A1* | 7/2011 | Montemurro et al. | 370/338 |
| 2011/0258139 A1* | 10/2011 | Steiner | 705/36 R |
| 2012/0165018 A1 | 6/2012 | Zhao et al. | |

OTHER PUBLICATIONS

WiMAX Forum®, "WiMAX Forum® Network Architecture, Architecture, Detailed Protocols and Procedures WiMAX®—3GPP EPS Interworking WMF-T37-009-R016v01," WiMAX Forum® Approved, Nov. 30, 2010, pp. 1-42.

* cited by examiner

METHOD FOR ACCOUNTING INFORMATION HANDLING IN AN INTERWORKING

TECHNICAL FIELD

The present invention relates generally to wireless communications, and more particularly to a method for accounting information handling in an interworking.

BACKGROUND

As wireless communications systems continue to evolve and improve, it may be common for a service area to be served by multiple wireless communications systems as service providers upgrade equipment while keeping older equipment operational for compatibility purposes. When two (or more) wireless communications systems serve a common service area and allow a communications device to access both wireless communications systems, the result may be referred to as an interworking.

An accounting problem may arise when a WiMAX network is interworking with a non-WiMAX network, such as the Third Generation Partnership Project (3GPP) Long Term Evolution (LTE), with the WiMAX network providing access to the non-WiMAX network since the WiMAX network may not specify or support all of the accounting methods supported in the non-WiMAX network. Additionally, a format of accounting messages from the WiMAX network may not be the same as those supported in the non-WiMAX network. In general, a first network providing access to a second network may be referred to as an access network.

Furthermore, the non-WiMAX network may generate accounting information of its own and may choose to ignore accounting information from the WiMAX network. Therefore, accounting information generated by the WiMAX network and injected into both the WiMAX network and the non-WiMAX network may increase the amount of network traffic, thereby potentially reducing overall network performance by increasing network overhead.

SUMMARY

These and other problems are generally solved or circumvented, and technical advantages are generally achieved, by embodiments of a method for accounting information handling in an interworking.

In accordance with an embodiment, a method for processing accounting information by a gateway device is provided. The method includes sending an accounting request message to a first electronic device, receiving a response message from the first electronic device, and processing accounting information. The accounting request message is related to a communications device attached to a first network, the response message is responsive to the accounting request message, and the processing is based on the response message. The gateway device and the first electronic device are part of the first network, the communications device is accessing a second network through the first network, and the communications device has a subscription only with the second network.

In accordance with another embodiment, a method for processing accounting information by an authentication device is provided. The method includes receiving an accounting request message from a first electronic device, and sending a response message responsive to the accounting request message to the first electronic device. The accounting request message is related to a communications device attached to a first network, and the authentication device and the first electronic device are part of the first network. The communications device is accessing a second network through the first network, and the communications device has a service subscription only with the second network.

In accordance with another embodiment, a method for processing accounting information by a gateway device is provided. The method includes determining if a communications device is participating in an interworking with a first network and a second network, stopping generation of accounting information for the communications device if the communications device is participating in an interworking with the first network and the second network, and continuing to generate accounting information for the communications device if the communications device is not participating in an interworking with the first network and the second network. The communications device is accessing a second network through the first network, and the communications device has a subscription only with the second network.

An advantage of an embodiment is that accounting information and accounting messages from a WiMAX network, wherein the WiMAX network is providing access, are handled without impacting a 3GPP network and minimally impacting WiMAX performance.

A further advantage of an embodiment is that an existing parameter in an existing message is used to control the handling of accounting information and accounting messages. Therefore, additions and/or modifications to existing message formats and protocols are not needed.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an interworking with a WiMAX compliant network serving as an access network and a 3GPP LTE compliant network, where a mobile is using the WiMAX network to access the 3GPP network. The invention may also be applied, however, to other interworkings, such as CDMA-LTE-A, HRPD-LTE, HRPD-LTE-A, CDMA2000-LTE, CDMA2000-LTE-A, CDMA-WiMAX, CDMA2000-WiMAX, CDMA-UMTS, CDMA2000-UMTS, WiMAX-LTE, WiMAX-LTE-A, UMTS-LTE, UMTS-LTE-A, and so on.

Figure 1:
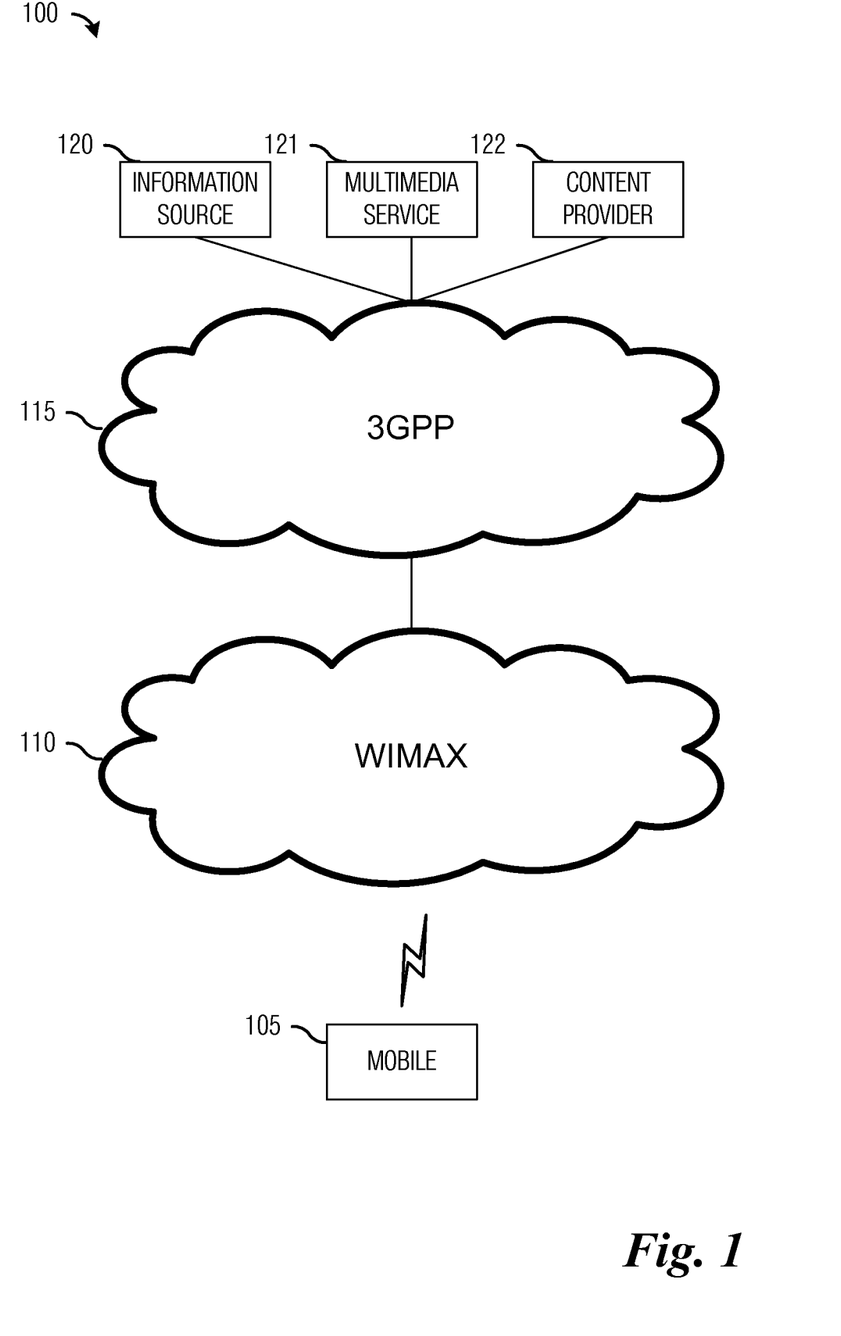
FIG. 1 is a diagram of a WiMAX-3GPP enhanced packet core (EPC) interworking.

FIG. 1 illustrates a WiMAX-3GPP enhanced packet core (EPC) interworking 100. As shown in FIG. 1, a mobile 105 may use a WiMAX compliant network 110 to access a 3GPP compliant network 115. Through 3GPP compliant network 115, mobile 105 may access information source 120, multimedia service 121, content provider 122, and so forth. Mobile 105 may access 3GPP compliant network 115 by first attaching to WiMAX compliant network 110 and then passing authentication/authorization with 3GPP compliant network 115.

Using WiMAX compliant network 110 to access 3GPP compliant network 115 may mean that mobile 105 incurs access charges from both 3GPP compliant network 115 and WiMAX compliant network 110. However, in a WiMAX-3GPP interworking, mobile 105 may be assumed to have a service subscription only with 3GPP compliant network 115.

Both 3GPP compliant network 115 and WiMAX compliant network 110 will generate accounting information for mobile 105. Accounting information may include information such as identity of mobile 105, access start/stop time, duration, service type, amount of data transferred, and so forth. The accounting information may be continuously generated while mobile 105 is in an active session. Furthermore, depending on service agreements, WiMAX compliant network 110 may transmit accounting information to 3GPP compliant network 115 so that 3GPP compliant network 115 may accurately charge mobile 105.

Since mobile 105 is operating through both 3GPP compliant network 115 and WiMAX compliant network 110, the accounting information generated by WiMAX compliant network 110 may be redundant. Because the accounting information generated by WiMAX compliant network 110 may be redundant, the transmission of the accounting information to 3GPP compliant network 115 may negatively impact performance of 3GPP compliant network 115 by increasing network traffic, for example. Additionally, the generation of redundant accounting information by WiMAX compliant network 110 may also impact the performance of WiMAX compliant network 110.

Figure 2:
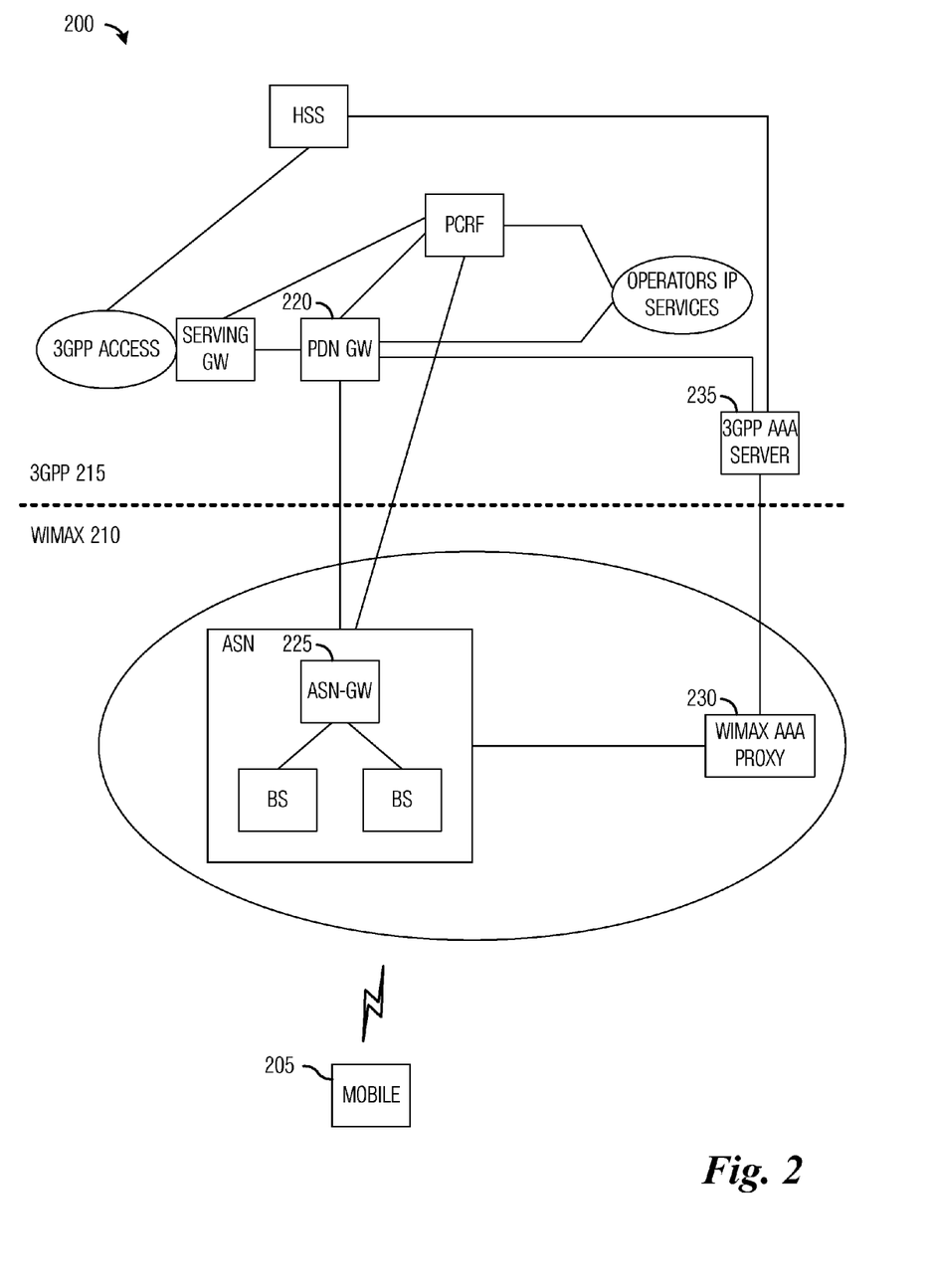
FIG. 2 is a diagram of a detailed view of a WiMAX-3GPP EPC interworking.

FIG. 2 illustrates a detailed view of a WiMAX-3GPP EPC interworking 200. As discussed previously, in a WiMAX-3GPP EPC interworking scenario, a mobile, such as mobile 205, is assumed to have a subscription to the 3GPP compliant network, such as 3GPP compliant network 215, only. In the 3GPP compliant network, a packet data network gateway (PDN-GW) 220 may generate accounting records along with user data records (UDR) for any access technology, such as WiMAX, interworking with the 3GPP compliant network.

Accounting records for a session using WiMAX access through a WiMAX compliant network, such as WiMAX compliant network 210, may be generated by PDN-GW 220 (located in the 3GPP compliant network). Therefore, there is no need for any accounting information from the WiMAX compliant network, even to keep track of billing information related to mobile 205's use of the WiMAX compliant network.

However, in the WiMAX compliant network, an access service network gateway (ASN-GW) 225 may be required to generate accounting records as part of the WiMAX technical standards. ASN-GW 225 may generate accounting records even if they are not necessary in a WiMAX-3GPP EPC interworking scenario.

Typically, the accounting records generated by ASN-GW 225 may be transmitted to a WiMAX accounting/authentication/authorization (AAA) proxy 230, which may then transmit the accounting records to a 3GPP AAA server 235. Because ASN-GW 225 may generate a significant number of accounting records in a long standing connection with mobile 205, the transmission of the accounting records may consume a noticeable amount of available network resources in both the WiMAX compliant network and the 3GPP compliant network. Furthermore, the generation of the accounting records by ASN-GW 225 may increase the performance requirements of ASN-GW 225, for example, increase memory usage, processing power, etc.

Figure 3A:
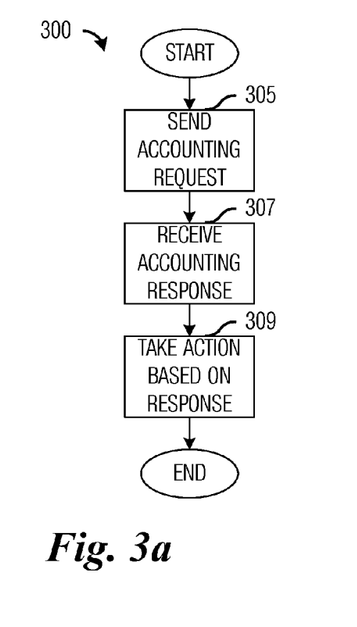
FIG. 3a is a flow diagram of high level ASN-GW operations in generating accounting reports.

FIG. 3a illustrates a flow diagram of high level ASN-GW operations 300 in generating accounting reports. ASN-GW operations 300 may be indicative of operations occurring in an ASN-GW, such as ASN-GW 225, of a WiMAX compliant network. ASN-GW operations 300 may occur when a mobile, such as mobile 205, uses the WiMAX compliant network to access a 3GPP compliant network. ASN-GW operations 300 may occur while the ASN-GW is in a normal operating mode and while the WiMAX compliant network participates in a WiMAX-3GPP EPC interworking with the 3GPP compliant network.

ASN-GW operations 300 may begin with the ASN-GW sending a message to a WiMAX AAA proxy (block 305). The message sent to the WiMAX AAA proxy may include an indication indicating that the message is an accounting request. The message may also include other indications.

The WiMAX AAA proxy, upon receipt of the message, may send back a response to the ASN-GW. The response message may or may not contain an indicator that is pertinent to the accounting request sent to the WiMAX AAA proxy. The ASN-GW may then receive the response from the WiMAX AAA proxy (block 307) and take action based on the response to the accounting request message (block 309). The ASN-GW may take different actions based on the response to the accounting request that it sent to the WiMAX AAA proxy. Several different actions that the ASN-GW may take are discussed in detail below. ASN-GW operations 300 may then terminate.

Figure 3B:
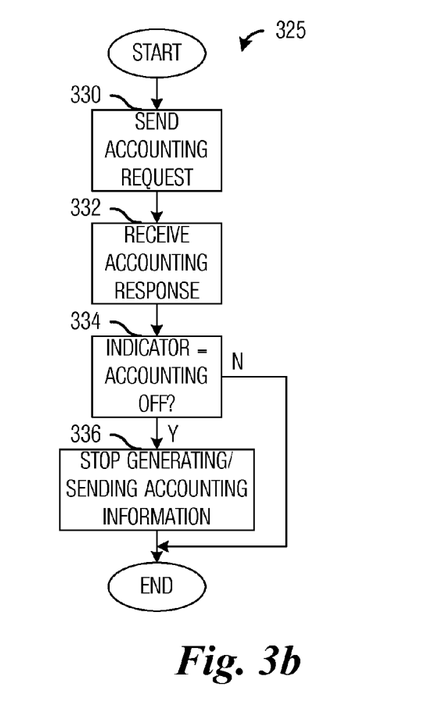
FIG. 3b is a flow diagram of first ASN-GW operations in generating accounting reports for a mobile participating in a WiMAX-3GPP EPC interworking.

FIG. 3b illustrates a flow diagram of first ASN-GW operations 325 in generating accounting reports for a mobile participating in a WiMAX-3GPP EPC interworking. ASN-GW operations 325 may be indicative of operations occurring in an ASN-GW, such as ASN-GW 225, of a WiMAX compliant network. ASN-GW operations 325 may occur when a mobile, such as mobile 205, uses the WiMAX compliant network to access a 3GPP compliant network. ASN-GW operations 325 may occur while the ASN-GW is in a normal operating mode and while the WiMAX compliant network participates in a WiMAX-3GPP EPC interworking with the 3GPP compliant network.

ASN-GW operations 325 may begin with the ASN-GW sending a message to a WiMAX AAA proxy (block 330). The message sent to the WiMAX AAA proxy may include an indication indicating that the message is an accounting request. The message may also include other indications.

The WiMAX AAA proxy, upon receipt of the message may send back a response to the ASN-GW. The response message may contain an indication indicating that accounting should be turned off (e.g., "accounting off"). According to an embodiment, the indication may be set to a specified value, for example, eight (8), to indicate that accounting should be turned off. Although the discussion focuses on a specific value for the indication, e.g., eight, any value for the indication may be used as long as the value has not already been reserved to indicate other indicators. Therefore, the discussion of the value eight should not be construed as being limiting to either the spirit or the scope of the embodiments. Additionally, the response message may contain other indications.

The ASN-GW may then receive the response message from the WiMAX AAA proxy (block 332). The ASN-GW may check to determine if there is an indication indicating that it should turn off generating accounting reports (block 334). If the response includes such an indication, then the ASN-GW may stop generating and sending accounting reports (block 336) and ASN-GW operations 325 may then terminate. If the response does not include such an indication, then the ASN-GW may continue generating and sending accounting reports and ASN-GW operations 325 may then terminate.

Figure 3C:
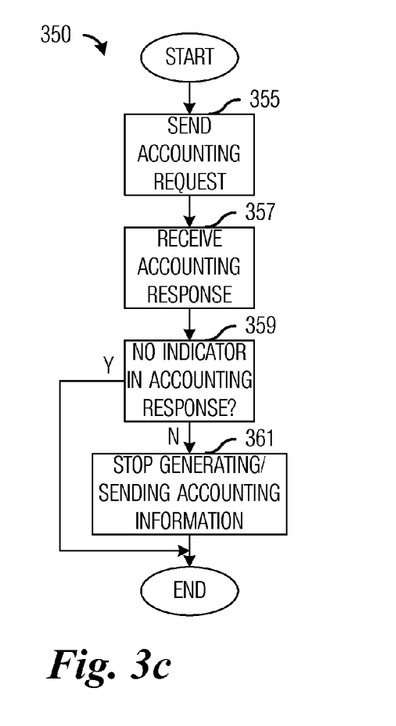
FIG. 3c is a flow diagram of second ASN-GW operations in generating accounting reports for a mobile participating in a WiMAX-3GPP EPC interworking.

FIG. 3c illustrates a flow diagram of second ASN-GW operations 350 in generating accounting reports for a mobile participating in a WiMAX-3GPP EPC interworking. ASN-GW operations 350 may be indicative of operations occurring in an ASN-GW, such as ASN-GW 225, of a WiMAX compliant network. ASN-GW operations 350 may occur when a mobile, such as mobile 205, uses the WiMAX compliant network to access a 3GPP compliant network. ASN-GW operations 350 may occur while the ASN-GW is in a normal operating mode and while the WiMAX compliant network participates in a WiMAX-3GPP EPC interworking with the 3GPP compliant network.

ASN-GW operations 350 may begin with the ASN-GW sending a message to a WiMAX AAA proxy (block 355). The message sent to the WiMAX AAA proxy may include an indication indicating that the message is an accounting request. The message may also include other indications.

The WiMAX AAA proxy, upon receipt of the message, may send back a response to the ASN-GW. The response message may not contain an indication indicating that accounting should be turned off "accounting off," as discussed previously. However, the response message may contain other indications.

The ASN-GW may then receive the response message from the WiMAX AAA proxy (block 357). The ASN-GW may check to determine if there is an indication indicating that it should turn off generating accounting reports (block 359). If the response does include such an indication, then the ASN-GW may stop generating and sending accounting reports (block 361) and ASN-GW operations 350 may then terminate. If the response does not include such an indication, then the ASN-GW may continue generating and sending accounting reports and ASN-GW operations 350 may then terminate.

Figure 3D:
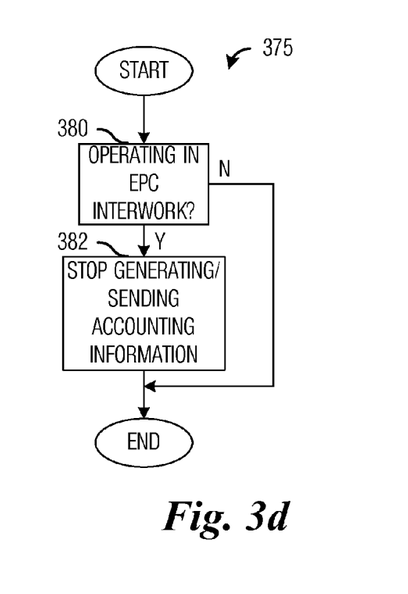
FIG. 3d is a flow diagram of third ASN-GW operations in generating accounting reports for a mobile participating in a WiMAX-3GPP EPC interworking.

FIG. 3d illustrates a flow diagram of third ASN-GW operations 375 in generating accounting reports for a mobile participating in a WiMAX-3GPP EPC interworking. ASN-GW operations 375 may be indicative of operations occurring in an ASN-GW, such as ASN-GW 225, of a WiMAX compliant network. ASN-GW operations 375 may occur when a mobile, such as mobile 205, uses the WiMAX compliant network to access a 3GPP compliant network. ASN-GW operations 375 may occur while the ASN-GW is in a normal operating mode and while the WiMAX compliant network participates in a WiMAX-3GPP EPC interworking with the 3GPP compliant network.

ASN-GW operations 375 may begin with the ASN-GW performing a check to determine if it is operating in an interworking with a 3GPP EPC (block 380). According to an embodiment, the ASN-GW may be able to determine that it is operating in an interworking by examining message traffic originating from the mobile, for example, the ASN-GW may examine message type of message traffic from the mobile, connection types requested by message traffic from the mobile, an intended destination of the message traffic from the mobile, and so on.

If the ASN-GW is operating in an interworking with a 3GPP EPC, then the ASN-GW may stop generating accounting records for the mobile (block 382). Additionally, if the ASN-GW has already generated accounting records for the mobile, then the ASN-GW may suppress transmission of the generated accounting records if they have not already been sent. According to an embodiment, the ASN-GW may stop generating accounting records for the mobile only for connections involving the mobile and the 3GPP EPC. For example, if the mobile has several active connections and at least one of them does not involve the 3GPP EPC, then the ASN-GW may still continue to generate accounting records for the connection(s) not involving the 3GPP EPC. ASN-GW operations 375 may then terminate.

If the ASN-GW is not operating in an interworking with a 3GPP EPC, then the ASN-GW may continue generating accounting records for the mobile and ASN-GW operations 375 may then terminate.

Figure 4A:
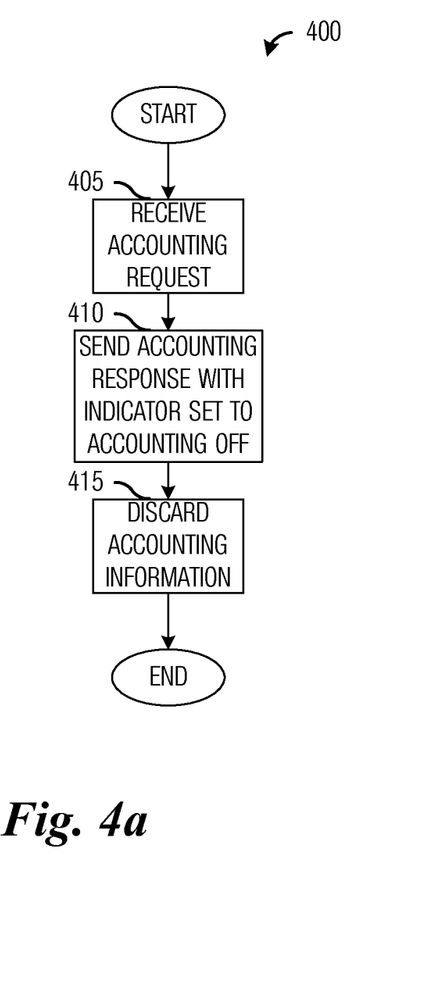
FIG. 4a is a flow diagram of first WiMAX AAA proxy operations in handling accounting reports from a ASN-GW for a mobile participating in a WiMAX-3GPP EPC interworking.

FIG. 4a illustrates a flow diagram of first WiMAX AAA proxy operations 400 in handling accounting reports from a ASN-GW for a mobile participating in a WiMAX-3GPP EPC interworking. WiMAX AAA proxy operations 400 may be indicative of operations occurring in a WiMAX AAA proxy, such as WiMAX AAA proxy 230, of a WiMAX compliant network. WiMAX AAA proxy operations 400 may occur when a mobile, such as mobile 205, uses the WiMAX compliant network to access a 3GPP compliant network. WiMAX AAA proxy operations 400 may occur while the WiMAX AAA proxy is in a normal operating mode and while the WiMAX compliant network participates in a WiMAX-3GPP EPC interworking with the 3GPP compliant network.

WiMAX AAA proxy operations 400 may begin with the WiMAX AAA proxy receiving a message from an ASN-GW, wherein the message includes an indication indicating that the message is an accounting request (block 405). The message received by the WiMAX AAA proxy may also include other indications.

In response to the received message with the indication indicating that the message is an accounting request, the WiMAX AAA proxy may send back to the ASN-GW a response message that contains an indication indicating that accounting should be turned off (e.g., "accounting off") (block 410). According to an embodiment, the indication may be set to a specified value, for example, eight (8), to indicate accounting off. Although the discussion focuses on a specific value for the indication, e.g., eight, any value for the indication may be used as long as the value has not already been reserved to indicate other indicators. Therefore, the discussion of the value eight should not be construed as being limiting to either the spirit or the scope of the embodiments. Additionally, the response message may contain other indications. The response message may also contain other indications.

If the WiMAX AAA proxy continues to receive messages from the ASN-GW containing accounting records, the WiMAX AAA proxy may discard the accounting records (block 415). WiMAX AAA proxy operations 400 may then terminate.

Figure 4B:
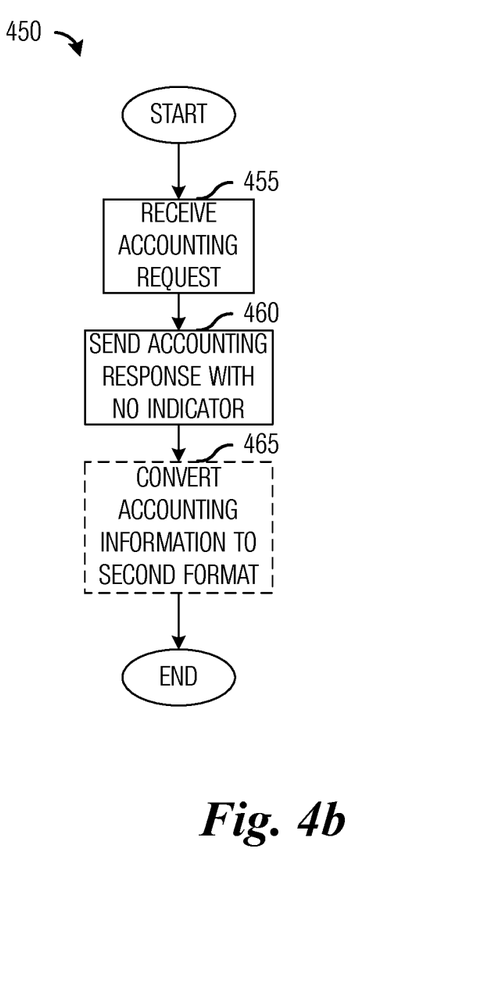
FIG. 4b is a flow diagram of second WiMAX AAA proxy operations in handling accounting reports from a ASN-GW for a mobile participating in a WiMAX-3GPP EPC interworking.

FIG. 4b illustrates a flow diagram of second WiMAX AAA proxy operations 450 in handling accounting reports from a ASN-GW for a mobile participating in a WiMAX-3GPP EPC interworking. WiMAX AAA proxy operations 450 may be indicative of operations occurring in a WiMAX AAA proxy, such as WiMAX AAA proxy 230, of a WiMAX compliant network. WiMAX AAA proxy operations 450 may occur when a mobile, such as mobile 205, uses the WiMAX compliant network to access a 3GPP compliant network. WiMAX AAA proxy operations 450 may occur while the WiMAX AAA proxy is in a normal operating mode and while the WiMAX compliant network participates in a WiMAX-3GPP EPC interworking with the 3GPP compliant network.

WiMAX AAA proxy operations 450 may begin with the WiMAX AAA proxy receiving a message from an ASN-GW, wherein the message includes an indication indicating that the message is an accounting request (block 455). The message received by the WiMAX AAA proxy may also include other indications.

In response to the received message with the indication indicating that the message is an accounting request, the WiMAX AAA proxy may send back to the ASN-GW a response message that contains no indication related to accounting (block 460). Although the response message may not contain an indication related to accounting, the response message may contain other indications.

If the WiMAX AAA proxy receives accounting records from the ASN-GW, then the WiMAX AAA proxy may optionally convert the accounting records into a 3GPP format and send the converted accounting records to a 3GPP AAA server (block 465). Conversion of the accounting records from the WiMAX format into the 3GPP format may include placing sufficient information into the 3GPP formatted accounting records for correlation purposes. WiMAX AAA proxy operations 450 may then terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In a gateway device in an access network, a method for processing accounting information, the method comprising:
   sending, by the gateway device in the access network, an accounting request message to a proxy device in the access network, wherein the accounting request message is related to a mobile that accesses a second network through the access network, the second network being different than the access network;
   receiving, by the gateway device, a response message from the proxy device, the response message responsive to the accounting request message, wherein the response message comprises an indicator indicating that accounting should be turned off; and
   in accordance with the indicator in the response message, discontinuing, by the gateway device, accounting of the mobile which continues to access the second network through the access network after the gateway device discontinues accounting of the mobile.

2. The method of claim 1, wherein the indicator comprises an integer value of eight.

3. The method of claim 1, wherein discontinuing accounting comprises ceasing generation of accounting information related to the mobile by the gateway device.

4. The method of claim 3, wherein the mobile has at least two connections, wherein at least one connection is with the second network through the access network, and wherein stopping a generation of accounting information comprises stopping a generation of accounting information for the at least one connection with the second network through the access network.

5. The method of claim 1, wherein the proxy device comprises an authentication device.

6. The method of claim 5, wherein the access network comprises a WiMAX compliant network, and wherein the second network comprises a 3GPP EPC compliant network.

7. In an authentication device in an access network a method for processing accounting information, the method comprising:
   receiving, by the authentication device in the access network, an accounting request message from a gateway device in the access network, wherein the accounting request message is related to a mobile that accesses a second network through the access network; and
   sending, by the authentication device, a response message responsive to the accounting request message to the gateway device,
   wherein the response message comprises an indicator indicating that accounting should be turned off, the indicator configured to prompt the gateway to stop generating accounting information pertaining to the mobile, which continues to access the second network through the access network after the gateway device stops generating accounting information pertaining to the mobile.

8. The method of claim 7, wherein the indicator comprises an integer value of eight.

9. The method of claim 7, further comprising discarding, by the authentication device, accounting information received from the gateway device, wherein the accounting information is related to the mobile.

10. The method of claim 1, wherein the mobile communicates data traffic to the second network via the access network after the gateway device discontinues accounting for the mobile, the data traffic being different than control information.

11. The method of claim 1, wherein accounting information related to the mobile is not generated by any device in the access network after the gateway device discontinues accounting for the mobile.

12. The method of claim 1, wherein accounting information generated by the gateway device located in the access network is duplicative of accounting information generated by a device in the second network.

13. The method of claim 7, wherein the mobile communicates data traffic to the second network via the access network after the gateway device stops generating accounting information pertaining to the mobile, the data traffic being different than control information.

14. A gateway device comprising:
   a processor; and
   a non-transitory computer readable storage medium storing programming for execution by the processor, the programming including instructions to:
   generate accounting information pertaining to a mobile that accesses a second network through the access network, wherein the gateway device is located within the access network, and wherein the access network is distinct from the second network;
   receive an indication to stop generating the accounting information, wherein the indication is received from a proxy device located within the access network; and
   in accordance with the indication, stop generating the accounting information pertaining to the mobile which continues to access the second network through the access network after the gateway device stops generating the accounting information.

15. The gateway device of claim 14, wherein the accounting information generated by the gateway device is redundant with accounting information generated by a device in the second network.

16. The gateway device of claim 14, wherein the mobile communicates data traffic to the second network via the access network after the gateway device stops generating accounting information pertaining to the mobile, the data traffic being different than control information.

17. An authentication device in an access network, the authentication device comprising:
   a processor; and
   a non-transitory computer readable storage medium storing programming for execution by the processor, the programming including instructions to:
   determine that a device in a second network is accounting for a mobile that accesses the second network through the access network, wherein the authentication device is located in the access network; and
   send, to a gateway device located within the access network, an indication to prompt the gateway device to stop generating accounting information for the mobile which continues to access the second network through the access network after the gateway device stops generating the accounting information.

18. The authentication device of claim 17, wherein the accounting information generated by the gateway device is redundant with accounting information generated by the device in the second network.

19. The gateway device of claim 17, wherein the mobile communicates data traffic to the second network via the access network after the gateway device stops generating accounting information pertaining to the mobile, the data traffic being different than control information.

* * * * *